United States Patent
Yamada

(10) Patent No.: US 11,914,352 B2
(45) Date of Patent: Feb. 27, 2024

(54) MACHINING ESTIMATION APPARATUS, MACHINING ESTIMATION METHOD, AND MACHINING ESTIMATION PROGRAM

(71) Applicant: AMADA CO., LTD., Kanagawa (JP)

(72) Inventor: Yoshinori Yamada, Kanagawa (JP)

(73) Assignee: Amada Co., Ltd., Kanagawa (JP)

( * ) Notice: Subject to any disclaimer, the term of this patent is extended or adjusted under 35 U.S.C. 154(b) by 382 days.

(21) Appl. No.: 17/432,967

(22) PCT Filed: Jan. 31, 2020

(86) PCT No.: PCT/JP2020/003716
§ 371 (c)(1),
(2) Date: Aug. 23, 2021

(87) PCT Pub. No.: WO2020/175013
PCT Pub. Date: Sep. 3, 2020

(65) Prior Publication Data
US 2022/0155762 A1 May 19, 2022

(30) Foreign Application Priority Data
Feb. 27, 2019 (JP) .................................. 2019-033758

(51) Int. Cl.
*G05B 19/418* (2006.01)
*G06T 7/00* (2017.01)

(52) U.S. Cl.
CPC ... *G05B 19/4188* (2013.01); *G05B 19/41885* (2013.01); *G06T 7/0004* (2013.01);
(Continued)

(58) Field of Classification Search
CPC .......... G05B 19/4188; G05B 19/41885; G05B 2219/35005; G05B 2219/35164; G06T 7/0004
See application file for complete search history.

(56) References Cited

U.S. PATENT DOCUMENTS

2004/0073469 A1   4/2004  Emori

FOREIGN PATENT DOCUMENTS

| CN | 1217986 A | 6/1999 |
| CN | 1392063 A | 1/2003 |

(Continued)

OTHER PUBLICATIONS

International Search Report for corresponding Application No. PCT/JP2020/003716, dated Mar. 3, 2020.
(Continued)

*Primary Examiner* — Michael W Choi
(74) *Attorney, Agent, or Firm* — Renner, Otto, Boisselle, Sklar, LLP

(57) ABSTRACT

A camera photographs a part to be estimated, which is produced by cutting a sheet metal in advance, and a dimension reference marker. An image processing unit generates edge data by extracting an edge of the part photographed by the camera, and enlarges or reduces the edge data based on a size of the dimension reference marker photographed by the camera such that a size of the edge corresponds to an actual size of the part. A machining time calculation unit calculates a length of a cutting line for cutting out the part from the sheet metal based on the edge of the edge data corresponding to the actual size of the part, and calculates a machining time for producing the part by cutting the cutting line in accordance with a material and a thickness of the sheet metal.

11 Claims, 10 Drawing Sheets

(52) U.S. Cl.
CPC .............. *G05B 2219/35005* (2013.01); *G05B 2219/35164* (2013.01)

(56) References Cited

FOREIGN PATENT DOCUMENTS

| | | | |
|---|---|---|---|
| CN | 102441581 A | 5/2012 | |
| CN | 103218467 A | 7/2013 | |
| CN | 104339658 A | 2/2015 | |
| CN | 107180790 A | 9/2017 | |
| CN | 107262933 A | 10/2017 | |
| EP | 0917035 A2 | 5/1999 | |
| JP | 4-267484 A | 9/1992 | |
| JP | 2001-101430 A | 4/2001 | |
| JP | 2002-203007 A | 7/2002 | |
| KR | 10-2010-0086883 A | 8/2010 | |
| WO | WO-2013175869 A1 * | 11/2013 | ............. G06F 17/50 |

OTHER PUBLICATIONS

Written Opinion for corresponding Application No. PCT/JP2020/003716, dated Mar. 3, 2020.
Extended European Search Report for corresponding EP Application No. 20762566.6 dated Mar. 7, 2022.

* cited by examiner

MACHINING ESTIMATION APPARATUS, MACHINING ESTIMATION METHOD, AND MACHINING ESTIMATION PROGRAM

TECHNICAL FIELD

The present disclosure relates to a machining estimation apparatus, a machining estimation method, and a machining estimation program for estimating a machining time for machining a part.

BACKGROUND ART

In order to estimate a machining time for machining a part, the following processes are required. When there is graphic data of a part, a CAD (Computer Aided Design) program reads out the graphic data of the part, and when there is no graphic data but only a paper drawing, the CAD program traces the part on the drawing and prepare graphic data. Additionally, a CAM (Computer Aided Manufacturing) program executes machining layout processing for the part based on the graphic data, and a piece of simulation software calculates the machining time.

Patent Document 1 describes an example of the machining estimation method.

CITATION LIST

Patent Literature

Patent Literature 1: Japanese Patent Laid-open No. 2002-203007

SUMMARY

Conventionally, in order for a salesperson to present a quotation to a customer who is a user or a prospective purchaser of a machining apparatus, it is necessary to estimate the machining time by the above-described machining estimation method and prepare a written quotation. It takes multiple days to prepare the written quotation and present it to the customer, which makes it impossible for the salesperson to immediately present the quotation to the customer.

An object of one or more embodiments is to provide a machining estimation apparatus, a machining estimation method, and a machining estimation program capable of immediately estimating a machining time for machining a part and presenting a quotation.

According to a first aspect of one or more embodiments, there is provided a machining estimation apparatus including a camera configured to photograph a part to be estimated and a dimension reference marker, the part to be estimated being produced by cutting a sheet metal in advance, an image processing unit configured to generate edge data by extracting an edge of the part photographed by the camera, and enlarges or reduces the edge data based on a size of the dimension reference marker photographed by the camera such that a size of the edge corresponds to an actual size of the part, and a machining time calculation unit configured to calculate a length of a cutting line for cutting out the part from the sheet metal based on the edge of the edge data corresponding to the actual size of the part, and calculate a machining time for producing the part by cutting the cutting line in accordance with a material and a thickness of the sheet metal.

According to a second aspect of one or more embodiments, there is provided a machining estimation method including photographing, by a camera, a part to be estimated and a dimension reference marker, the part to be estimated being produced by cutting a sheet metal in advance, generating, by an image processing unit, edge data by extracting an edge of the part photographed by the camera, enlarging or reducing, by the image processing unit, the edge data based on a size of the dimension reference marker photographed by the camera such that a size of the edge corresponds to an actual size of the part, and calculating, by a machining time calculation unit, a length of a cutting line for cutting out the part from the sheet metal based on the edge of the edge data corresponding to the actual size of the part, and calculating, by the machining time calculation unit, a machining time for producing the part by cutting the cutting line in accordance with a material and a thickness of the sheet metal.

According to a third aspect of one or more embodiments, there is provided a machining estimation program causing a computer to execute a step of generating, based on photographed image data obtained by photographing a part to be estimated and a dimension reference marker by a camera, edge data by extracting an edge of the part to be estimated, the part to be estimated being produced by cutting a sheet metal in advance, a step of enlarging or reducing the edge data based on a size of the dimension reference marker in the photographed image data such that a size of the edge corresponds to an actual size of the part, a step of calculating a length of a cutting line for cutting out the part from the sheet metal based on the edge of the edge data corresponding to the actual size of the part, and a step of calculating a machining time for producing the part by cutting the cutting line in accordance with a material and a thickness of the sheet metal.

According to the machining estimation apparatus, the machining estimation method, and the machining estimation program of the one or more embodiments, it is possible to immediately estimate the machining time for machining the part and present the quotation.

DESCRIPTION OF EMBODIMENT

Hereinafter, a machining estimation apparatus, a machining estimation method, and a machining estimation program according to one or more embodiments will be described with reference to the accompanying drawings.

Figure 1:
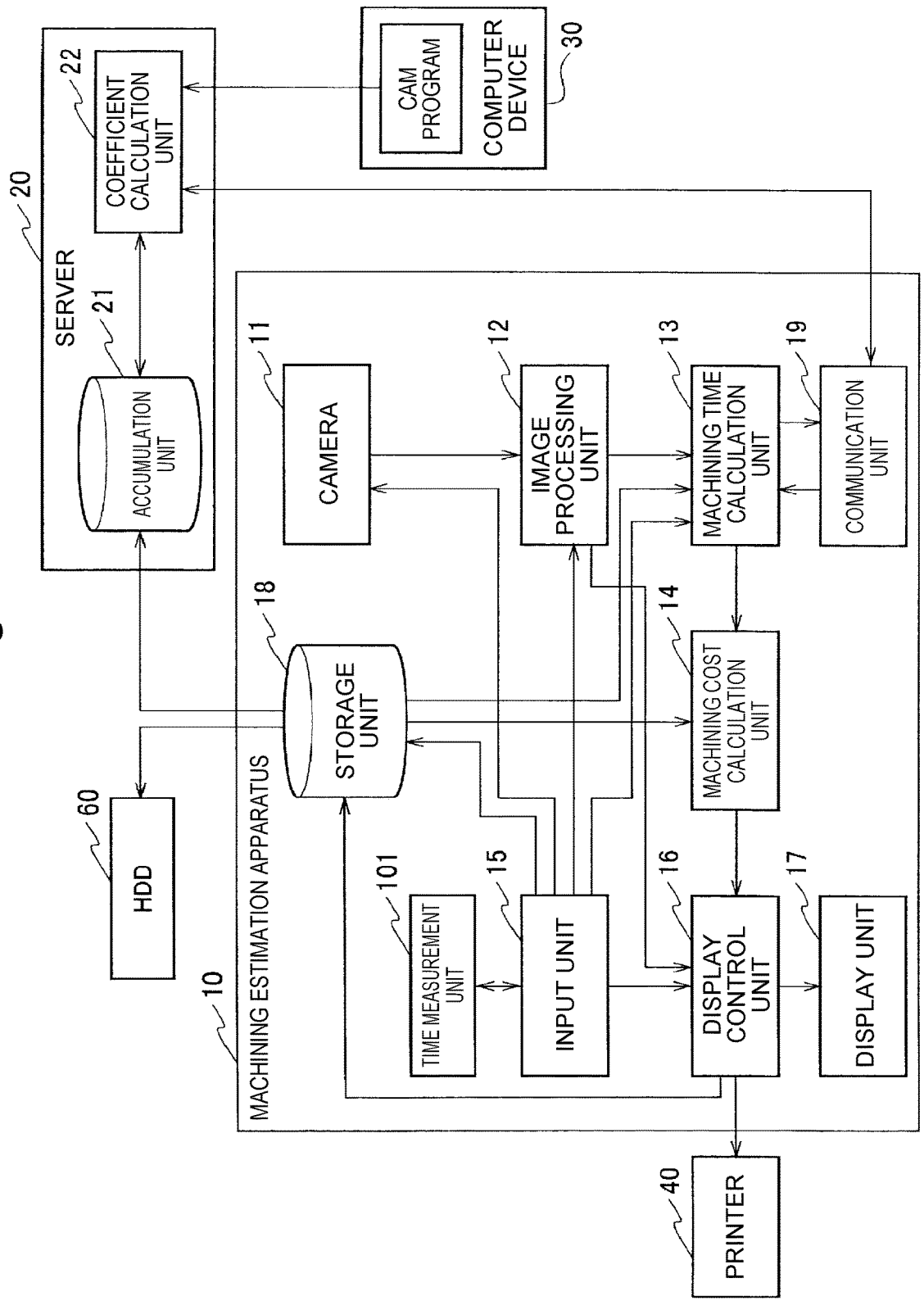
FIG. 1 is a block diagram showing a machining estimation apparatus according to one or more embodiments.

In FIG. 1, a machining estimation apparatus 10 is provided with a camera 11, an image processing unit 12, a machining time calculation unit 13, a machining cost calculation unit 14, an input unit 15, a display control unit 16, a display unit 17, a storage unit 18, a communication unit 19, and a time measurement unit 101. The machining estimation apparatus 10 can be configured in a computer terminal, a tablet terminal, or a smartphone. A printer 40 may be connected to the machining estimation apparatus 10.

The machining estimation apparatus 10 is connected to a server 20. The server 20 is provided with an accumulation unit 21 that accumulates an estimation result in which the machining estimation apparatus 10 estimates a machining time or a machining cost for machining various parts, and a coefficient calculation unit 22 that calculates a coefficient described later. It is not mandatory to connect the machining estimation apparatus 10 to the server 20, but it is preferable to connect the machining estimation apparatus 10 to the server 20. A computer device 30 that executes a CAM program is connected to the server 20.

Figure 2:
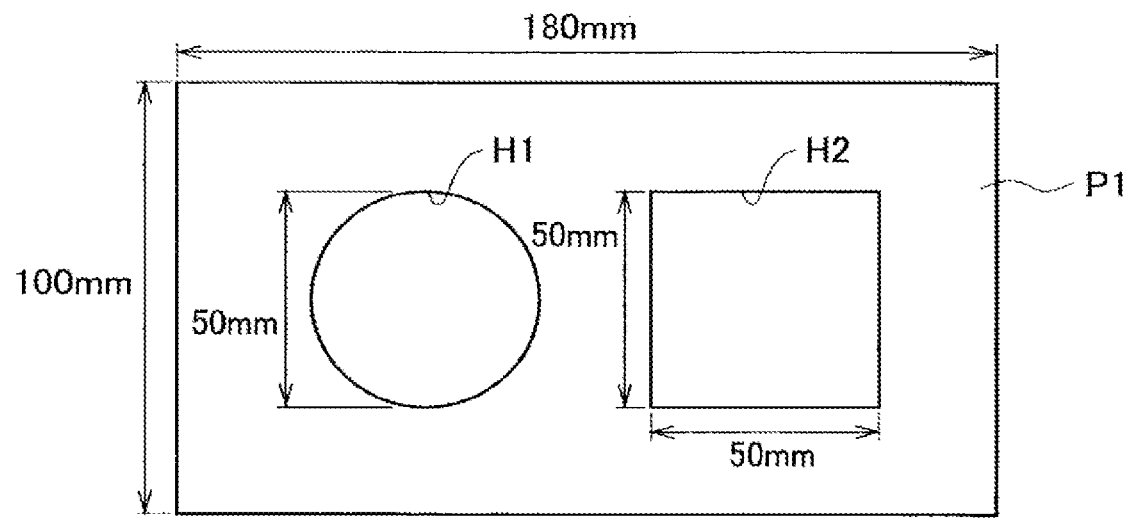
FIG. 2 is a plan view showing an example of a part to be estimated.

The operation when the machining estimation apparatus 10 estimates a part and the machining estimation method executed by the machining estimation apparatus 10 will be described by taking a part P1 shown in FIG. 2 as an example. The part P1 is an example of the part to be estimated, and is produced by cutting a sheet metal in advance with a predetermined machining apparatus. As shown in FIG. 2, the part P1 includes a circular hole H1 having a diameter of 50 mm and a square hole H2 having a side length of 50 mm, inside a rectangle having a width of 180 mm and a length of 100 mm.

An operator of the machining estimation apparatus 10 such as a salesperson uses the input unit 15 to input a model of the machining apparatus that produces the part P1 by cutting the sheet metal, a material and a thickness of the sheet metal from which the part P1 is cut out, and a machining method. The machining apparatus is, for example, a laser machining apparatus that cuts the sheet metal with a laser beam. The laser machining apparatus is provided with a machining head that emits the laser beam to the sheet metal to cut the sheet metal. The model of the machining apparatus input by the input unit 15 is a proposed model whose installation is to be proposed to the customer.

Figure 3:
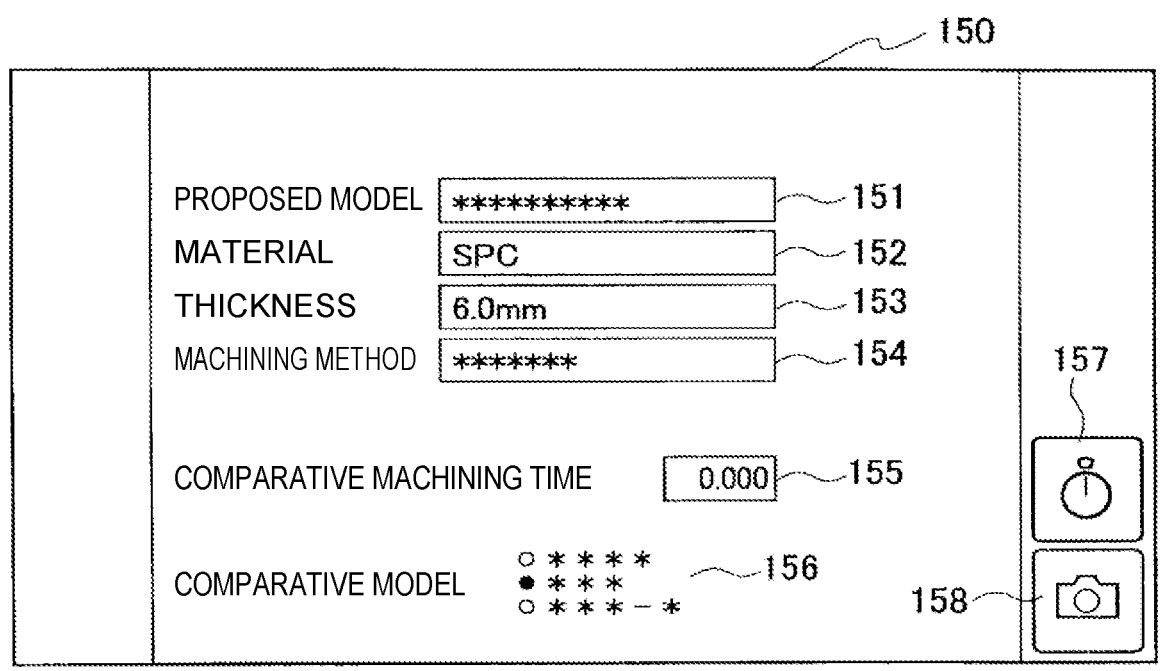
FIG. 3 is a diagram showing an example of a display image including an input window into which various kinds of information for estimating a machining time are input.

As shown in FIG. 3, the input unit 15 is a display image that is displayed on the display unit 17 by the display control unit 16 and includes an input window 150 into which various types of information are input. The input unit 15 may be a touch panel mounted on a screen of the display unit 17. The input window 150 includes a model input region 151 for inputting the proposed model, a material input region 152 for inputting the material of the sheet metal, a thickness input region 153 for inputting the thickness of the sheet metal, and a machining method input region 154 for inputting the machining method.

The model input region 151 may be an input region for selecting and inputting a model of the machining apparatus registered in advance by pull-down. The material input region 152 may be an input region for selecting and inputting a material of the sheet metal by pull-down from among a plurality of materials such as a cold rolled steel plate (SPC), a stainless steel plate, an aluminum plate, and an aluminum alloy plate. The thickness input region 153 may be an input region for directly inputting a numerical value of the thickness, or may be an input region for selecting and inputting the numerical value of the thickness by pull-down.

The machining method input region 154 may be an input region for selecting and inputting any machining method from among a plurality of machining methods by pull-down. The machining methods include a machining method in which nitrogen is used, a machining method in which oxygen is used, and a machining method in which air is used, as the type of assist gas, respectively.

In addition, the input window 150 includes a comparative machining time input region 155 for inputting a time required to produce the part P1 by a model that is already installed by the customer and is a comparative model to be compared with the proposed model inputted in the model input region 151. Further, the input window 150 includes a comparative model setting region 156 for selecting and setting a comparative model. The comparative model setting region 156 may be a region for selecting and setting the comparative model by pull-down.

On the display unit 17, a time measurement button 157 for measuring a time for actually cutting the sheet metal and producing the part P1 with the machining apparatus of the comparative model, and a camera button 158 for operating the camera 11 are displayed as the input unit 15. When the time measurement button 157 is pressed at the start of cutting of the sheet metal with the machining apparatus of the comparative model, the time measurement unit 101 starts measuring the time. When the time measurement button 157 is pressed again at the end of cutting thereof, the time measured by the time measurement unit 101 is input into the comparative machining time input region 155 as a comparative machining time. The comparative machining time may be directly input into the comparative machining time input region 155 without operating the time measurement unit 101.

The operator selects the comparative model in the comparative model setting region 156. If the comparative model is a model produced by another manufacturer, the options in the comparative model setting region 156 may not include the model produced by another manufacturer. In this case, an approximate machining cost of the comparative model can be calculated by selecting, as the comparative model, an in-house model equivalent to the comparative model produced by another manufacturer.

Figure 4:
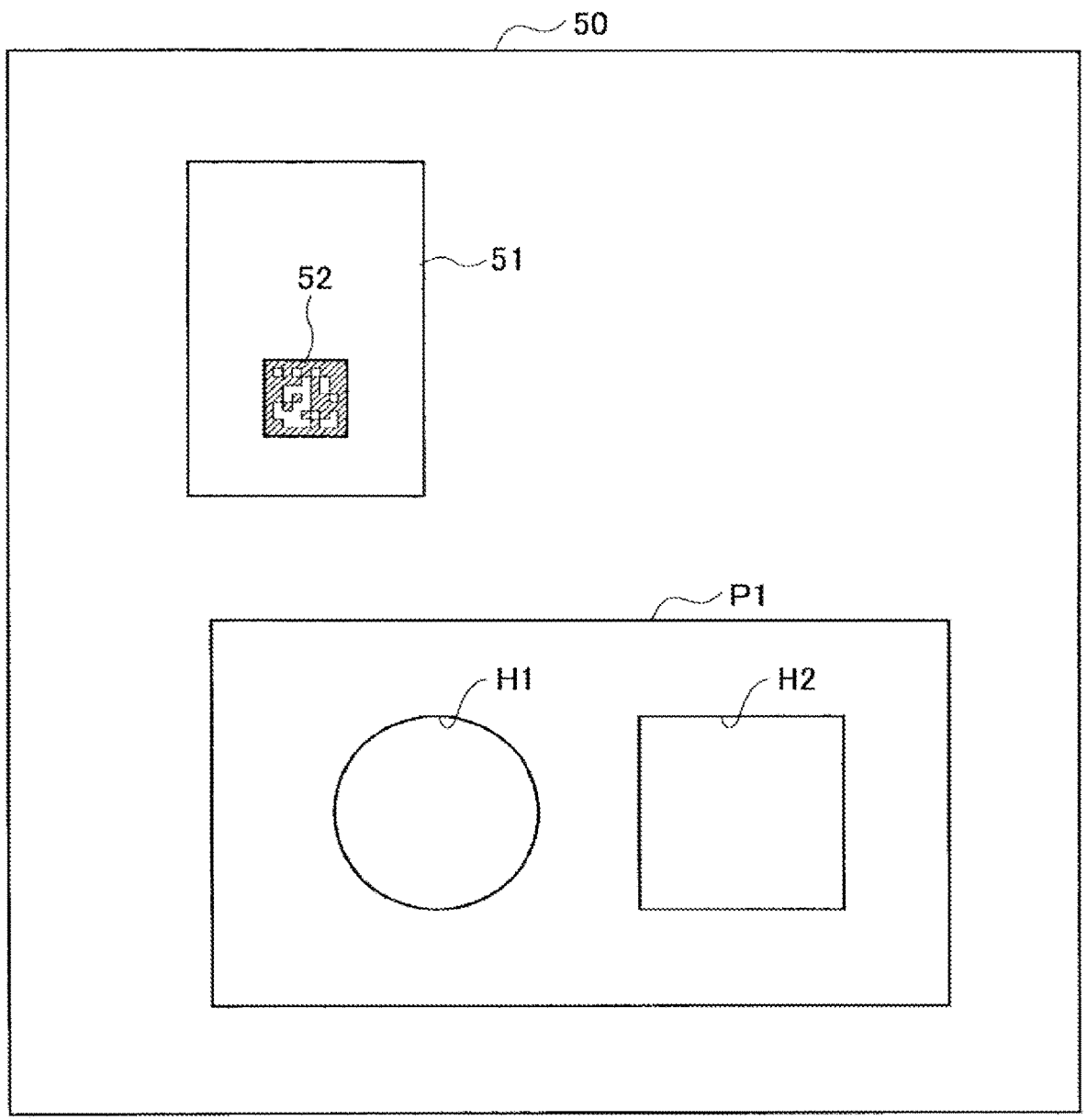
FIG. 4 is a plan view showing a state in which the part to be estimated and a marker plate are placed on a part photographing mat.

When the input of the proposed model, the material and the thickness of the sheet metal, the machining method, and the comparative machining time is completed in the input window 150, the operator uses the camera 11 in the manner as described below to photograph the part P1. As shown in FIG. 4, the operator places the part P1 and a marker plate 51 on a part photographing mat 50. The part photographing mat 50 is preferably a mat in a color that makes it easy to extract an edge of the part P1 based on the photographed image data of the part P1, for example, a mat in black.

A dimension reference marker 52 is stamped or printed on the marker plate 51. As an example, the dimension reference marker 52 is a square having a side of 2 cm. The dimension reference marker 52 includes a code indicating that it is a dimension reference marker. For example, the code indicating that it is a dimension reference marker consists of an AR marker. In the example shown in FIG. 4, the dimension reference marker 52 is provided on a part of the marker plate 51, but the marker plate 51 may have the same size as that of the dimension reference marker 52.

Figure 5:
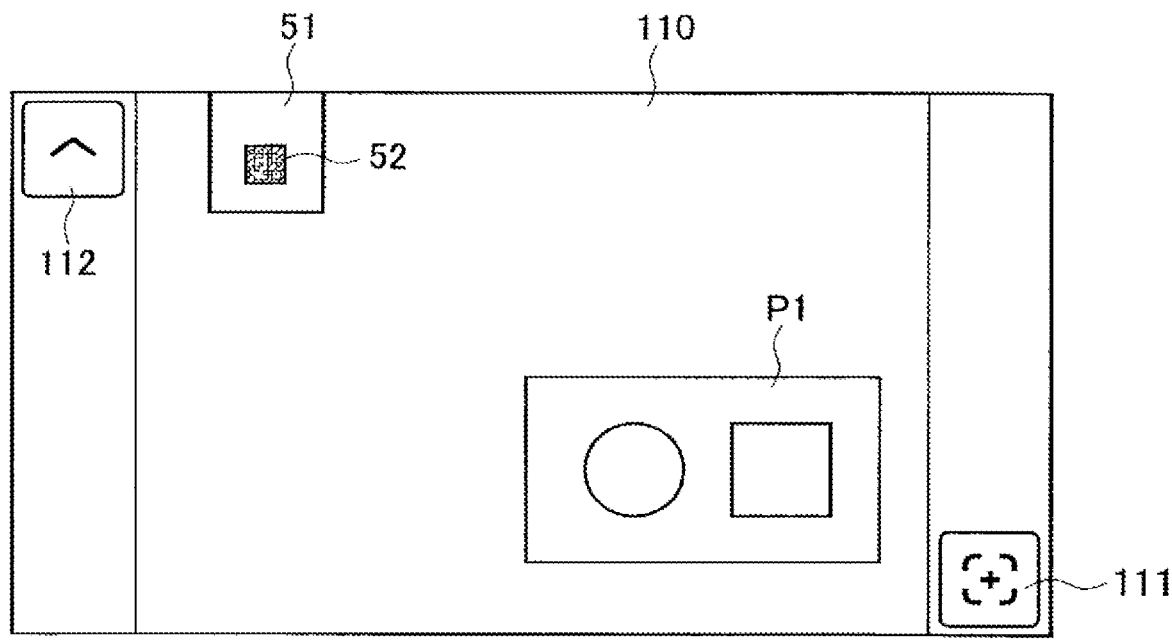
FIG. 5 is a diagram showing a photographed image in which the part to be estimated and the marker plate placed on the part photographing mat are photographed by a camera.

When the operator presses the camera button 158 to photograph the part P1 and the marker plate 51 on the part photographing mat 50 shown in FIG. 4, the camera 11 starts up. Image data photographed by the camera 11 is supplied to the image processing unit 12. The image processing unit 12 supplies the photographed image data to the display control unit 16. As a result, as shown in FIG. 5, a photographed image 110 that is a through image by the camera 11 is displayed on the display unit 17 in place of the input window 150. At this time, as the input unit 15, a determination button 111 and a return button 112 for determining the photography by the camera 11 are displayed on the display unit 17.

When the image processing unit 12 recognizes the dimension reference marker 52, the image processing unit 12 superimposes, for example, a thick frame in blue on the dimension reference marker 52, extracts the edge of the part P1, and indicates the edge by, for example, a graphic line segment in green. The image processing unit 12 extracts an outer peripheral edge that is an outer periphery of the part P1 and inner peripheral edges that are end portions of holes HI and H2. The operator only needs to press the determination button 111 after confirming that the thick frame is superimposed on the dimension reference marker 52 and confirming that the edge of the part P1 is indicated by the graphic line segment.

When the operator presses the determination button 111, the image processing unit 12 generates data of the edges including the outer peripheral edge and the inner peripheral edges at the time at which the determination button 111 is pressed, and supplies the edge data to the machining time calculation unit 13. When the operator presses the return button 112, the state is returned to the state shown in FIG. 3.

Now, when the camera 11 photographs the part P1 and the marker plate 51, the distance from the camera 11 to the part P1 is not constant, and the part P1 may be photographed at an angle. Therefore, the sizes of the photographed part P1 and marker plate 51 vary. Therefore, since the one side of the dimension reference marker 52 is 2 cm in actual size, the image processing unit 12 enlarges or reduces the edge data of the part P1 such that a size of the edge corresponds to the actual size based on the size of one side of the dimension reference marker 52 in the photographed image 110, and supply the enlarged/reduced edge data to the machining time calculation unit 13. For example, if the size of one side of the dimension reference marker 52 in the photographed image 110 is 1 cm, the actual size of the part P1 is obtained by enlarging twice the edge data of the part P1.

Figure 6:
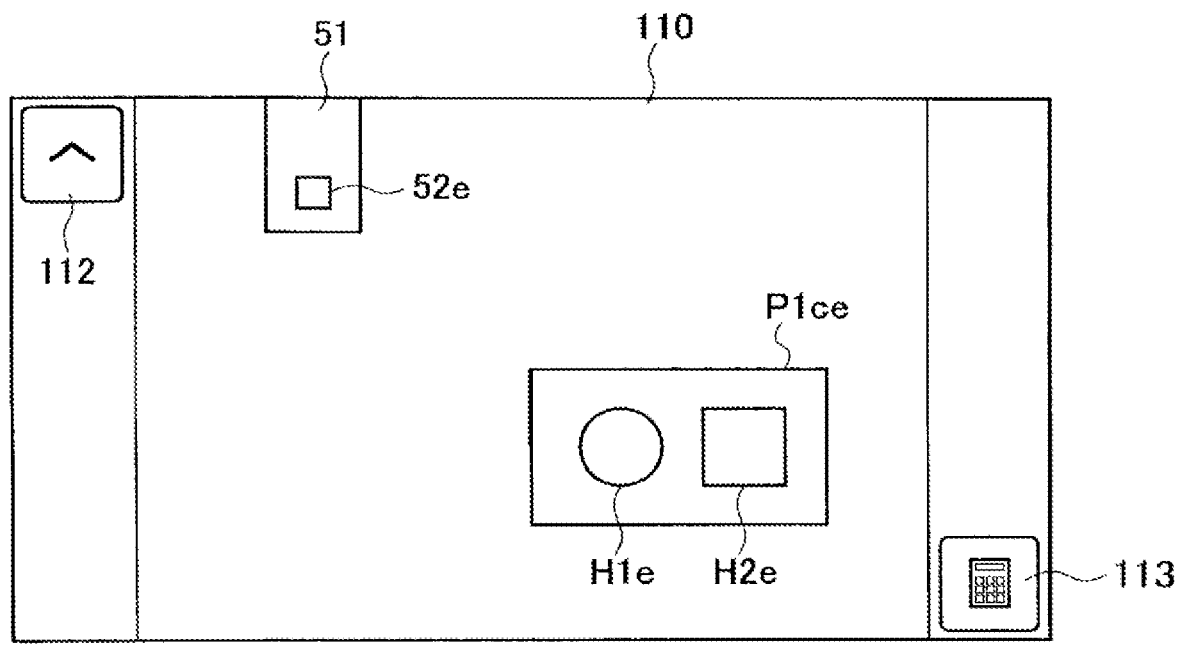
FIG. 6 is a diagram showing edge data in which an edge of the part to be estimated is enlarged or reduced such that a size of the edge corresponds to the actual size.

FIG. 6 shows the edge data in a state in which the photographed image 110 shown in FIG. 5 is reduced such that the one side of the dimension reference marker 52 is 2 cm after the operator presses the determination button 111 shown in FIG. 5. At this time, a calculation button 113 for starting a calculation is displayed, as the input unit 15, on the display unit 17 in place of the determination button 111. As shown in FIG. 6, the edge data of the photographed image 110 includes an edge P1*ce* of an outer periphery P1*c* of the part P1, edges H1*e* and H2*e* of the holes H1 and H2, and an edge 52*e* of the dimension reference marker 52. The edge data is supplied to the machining time calculation unit 13.

Figure 7:
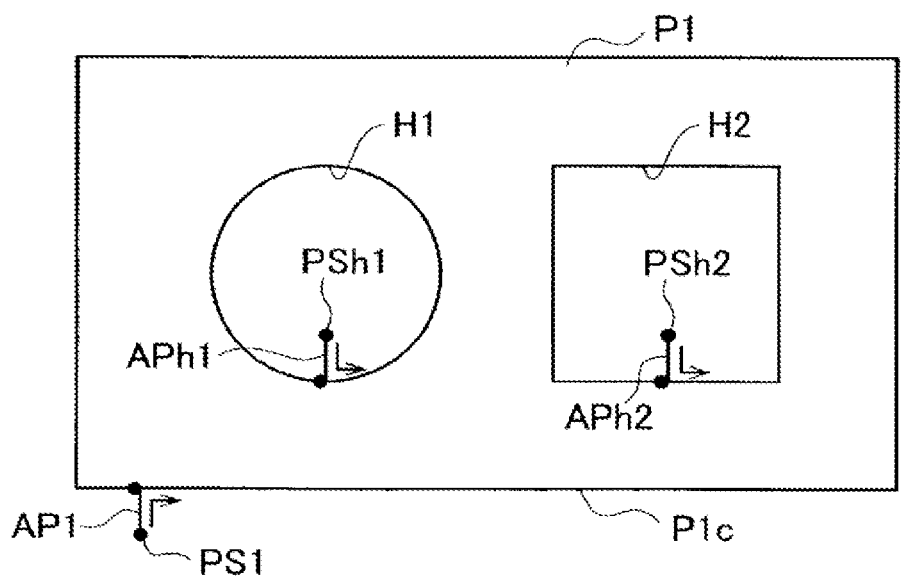
FIG. 7 is a diagram showing cutting lines of the part to be estimated and pierced holes and approaches that are necessary for cutting the part to be estimated from the sheet metal.

When the operator presses the calculation button 113, the machining time calculation unit 13 calculates the machining time of the part P1 in the manner as described below. The machining time calculation unit 13 converts the edge data of the part P1 into line segments of a straight line and circular arcs. As shown in FIG. 7, the machining time calculation unit 13 recognizes that a cutting line (outer peripheral cutting line) for cutting the outer periphery P1*c* of the part P1 is a line segment of a straight line of 560 mm. The machining time calculation unit 13 recognizes that a cutting line for forming the hole H1 is a line segment of a circular arc of 157 mm, and recognizes a cutting line for forming the hole H2 is a line segment of a straight line of 200 mm. The machining time calculation unit 13 recognizes that it is necessary to cut cutting lines of 917 mm in total to produce the part P1.

As shown in FIG. 7, in order to cut out the part P1 from the sheet metal, it is necessary to open a pierced hole PS1 outside of the part P1 and cut an approach AP1 from the pierced hole PS1 to the outer periphery P1*c* (outer peripheral cutting line). In addition, it is necessary to open pierced holes PSh1 and PSh2 in closed regions that are to be the hole H1 and the hole H2, respectively, and cut approaches APh1 and APh2 from the pierced holes PSh1 and PSh2 to the cutting lines of the holes H1 and H2. The approaches AP1, APh1 and APh2 are each assumed to be 5 mm.

In the storage unit 18, a machining condition table is stored in accordance with the material and the thickness of the sheet metal for each proposed model, which includes a time required to open the pierced hole, a machining velocity when the approach is cut, a machining velocity when the outer peripheral cutting line of the part is cut in a straight line or in a circular-arc shape, a machining velocity when the sheet metal is cut in a straight line to form a hole in the part, and a machining velocity when the sheet metal is cut in a circular-arc shape to form a hole in the part.

It is assumed that with the proposed model that is input in FIG. 3, the time required to open the pierced hole is 0.2 seconds, the machining velocity when the approach is cut is 6 mm/min, and the machining velocity when the outer peripheral cutting line of the part is cut in a straight line is 67 mm/min. In addition, it is assumed that the machining velocity when the sheet metal is cut in a straight line to form the hole in the part is 83 mm/min, and the machining velocity when the sheet metal is cut in a circular-arc shape to form the hole in the part is 75 mm/min.

The time required to cut the outer periphery P1*c* of the part P1 is 9.4 seconds, which is a total of 0.2 seconds that is a time for opening the pierced hole PS1, 0.8 seconds that is obtained by dividing the length of 5 mm of the approach AP1 by the machining velocity of 6 mm/min, and 8.4 seconds obtained by dividing the outer periphery P1c of 560 mm by 67 mm/min. The time required to form the hole H1 is 3.1 seconds, which is a total of 0.2 seconds that is a time for opening the pierced hole PSh1, 0.8 seconds that is obtained by dividing the length of 5 mm of the approach APh1 by the machining velocity of 6 mm/min, and 2.1 seconds obtained by dividing the cutting line of 157 mm by 75 mm/min. The time required to form the hole H2 is 3.4 seconds, which is a total of 0.2 seconds that is the time for opening the pierced hole PSh2, 0.8 seconds that is obtained by dividing the length of 5 mm of the approach APh2 by the machining velocity of 6 mm/min, and 2.4 seconds obtained by dividing the cutting line of 200 mm by 83 mm/min.

From the above, the time required to cut out the part P1 from the sheet metal is 15.9 seconds, which is a total of 9.4 seconds, 3.1 seconds, and 3.4 seconds. The time obtained here, 15.9 seconds, is the time totaling the time for cutting the outer peripheral cutting line that is the outer periphery P1c of the part P1 and the times for cutting the cutting lines of the holes H1 and H2 to form the holes H1 and H2, but a time for the machining head to move is not included. For example, it is assumed that that hole H2 is formed after the hole H1 is formed, and then the outer periphery P1c is cut. In this case, in addition to 15.9 seconds, a time for the machining head to move to directly above the pierced hole PSh2 after cutting the cutting line of the hole H1 and a time for the machining head to move to directly above the pierced hole PS1 after cutting the cutting line of the hole H2 are required.

Therefore, the machining time calculation unit 13 calculates an estimated machining time including the time for the machining head to move, by multiplying 15.9 seconds, which is the time required to cut out the part P1 from the sheet metal (total time), by a predetermined coefficient that is equal to or more than one. As an example, when the coefficient is 1.08, the machining time calculation unit 13 calculates the machining time of the part P1 to be 17.2 seconds. The machining time calculation unit 13 may hold the coefficient, or may read out the coefficient from the server 20 via the communication unit 19 as described later.

In this manner, the machining time calculation unit 13 multiplies the total time by the coefficient so that a time, in which the movement time of the machining head is added to the total time of the cutting times for actually cutting the part, is the machining time. It is preferable that the coefficient is set according to the material, the thickness, and the cutting method of the sheet metal, the number of holes inside the part, the size of the part, and the shape of the part. The reason for setting the coefficient according to the material, the thickness, and the cutting method is that the machining time is different even for parts having the same number of holes, the same size, and the same shape. It is preferable to set the coefficient for each combination of the material, the thickness, and the cutting method of the metal sheet, the number of holes inside the part, the size of the part, and the shape of the part.

The storage unit 18 stores a cost calculation table including a cost required to cut each 1 m of the sheet metal in accordance with the machining method for each proposed model and each comparative model. It is assumed that the cost per 1 m is 38 yen with the proposed model and in the machining method input in FIG. 3. The machining cost calculation unit 14 calculates the machining cost of the part P1 to be 34.9 yen by multiplying 917 mm (0.917 m) by 38 yen.

Figure 8:
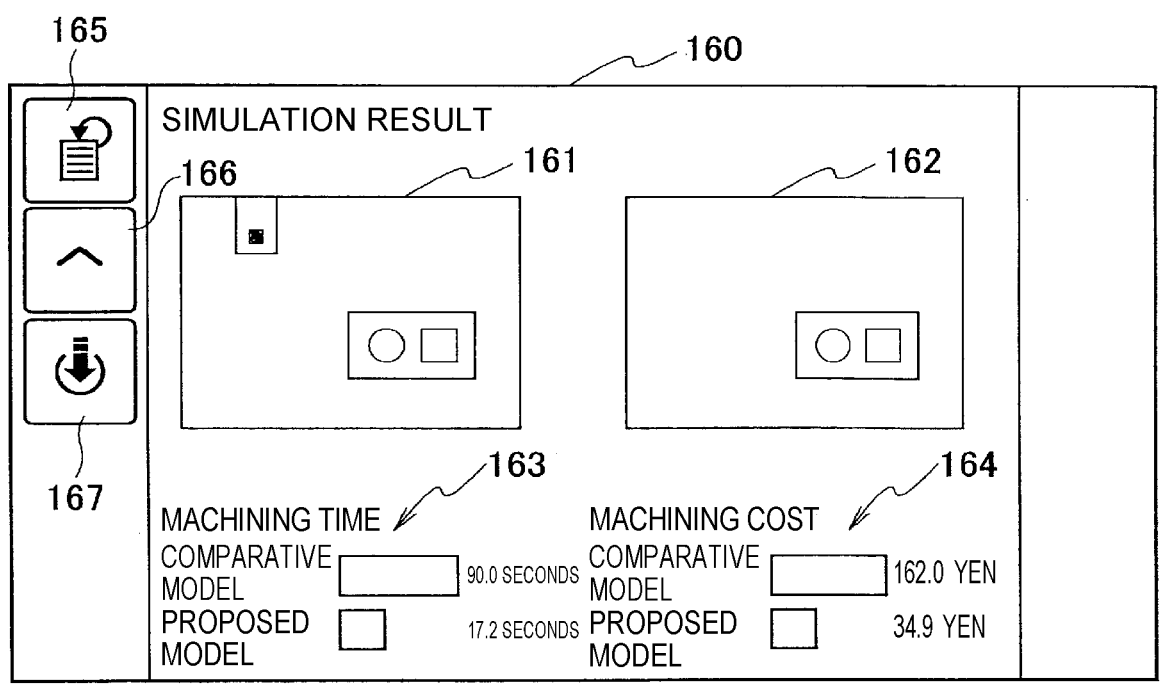
FIG. 8 is a diagram showing an example of a machining estimation image by the machining estimation apparatus, a machining estimation method, and a machining estimation program according to the one or more embodiments.

As shown in FIG. 8, the display control unit 16 controls the display unit 17 to display a machining estimation image 160 indicating an estimation result (simulation result). The machining estimation image 160 includes a photographed image 161 of the part P1 and the marker plate 51, an edge image 162 of the part P1 extracted by the image processing unit 12, a machining time comparison graph 163 that compares the machining times between the comparison model and the proposed model, and a machining cost comparison graph 164 that compares the machining costs between the comparison model and the proposed model. The photographed image 161 is an image similar to the photographed image 110 shown in FIG. 6.

It is preferable that as the machining cost, the machining cost comparison graph 164 displays the cost by dividing it into the consumables fee, the assist gas fee, and the electricity fee. The machining time comparison graph 163 may display a reduction rate of the machining time or a reduced time which is enabled by replacing the comparative model with the proposed model. The machining cost comparison graph 164 may display a reduction rate of the machining cost or a reduced cost which is enabled by replacing the comparative model with the proposed model.

The display control unit 16 supplies the estimation result to the storage unit 18. The storage unit 18 stores the estimation result of the part P1 and other parts. The estimation result stored in the storage unit 18 is transferred to the server 20 where the accumulation unit 21 accumulates the estimation result.

Figure 9:
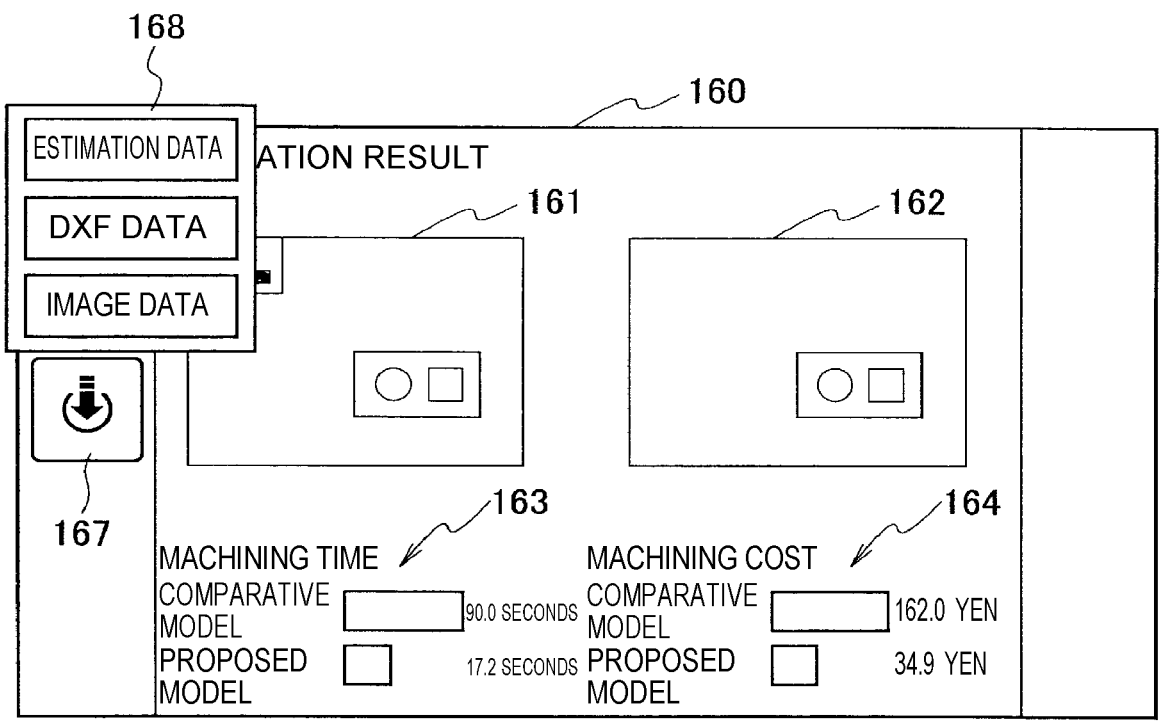
FIG. 9 is a diagram showing a download selection button displayed when a download button is pressed in the machining estimation image shown in FIG. 8.

In FIG. 8, a re-photography button 165, a return button 166, and a download button 167 are displayed on the display unit 17. When the operator presses the re-photography button 165, the state is returned to the state shown in FIG. 5. When the operator presses the return button 166, the state is returned to the state shown in FIG. 3. As shown in FIG. 9, when the operator presses the download button 167, download selection buttons 168 are displayed above the download button 167. The download selection buttons 168 include buttons indicated as "estimation data", "DXF data", and "image data".

The button of "estimation data" is a button to download data of the machining time comparison graph 163 and the machining cost comparison graph 164 across the local storage medium such as a computer terminal, a tablet terminal, or a smartphone. A hard disk drive (HDD) 60 shown in FIG. 1 is an example of the local storage medium.

The button of "DXF data" is a button for downloading the edge image 162 into the HDD 60 as DXF data for CAD. The button of "image data" is a button for downloading the image data of the photographed image 161 into the HDD 60. By selecting data to be downloaded and press the download button 167 again, the operator can download the selected data into the HDD 60.

Figure 10:
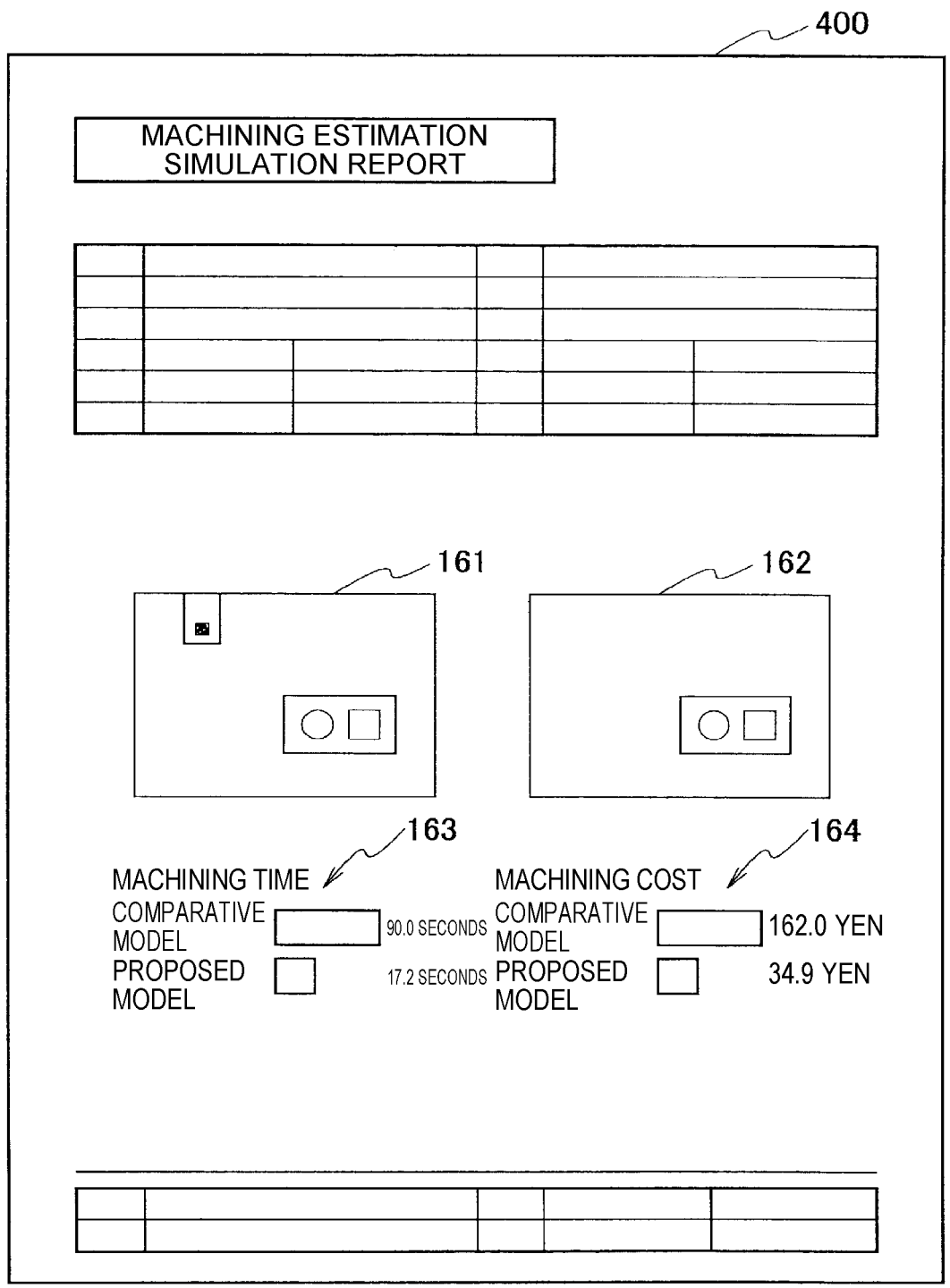
FIG. 10 is a diagram showing an example of a machining estimation simulation report printed by a printer.

When the operator instructs the printer 40 to print the estimation result shown in FIG. 8 by a predetermined operation, the printer 40 prints a machining estimation simulation report 400 as shown in FIG. 10. The photographed image 161, the edge image 162, the machining time comparison graph 163, and the machining cost comparison graph 164 that are the same as those in FIG. 8 are printed on the machining estimation simulation report 400.

The operator can immediately present the quotation to the customer by showing, to the customer, the machining estimation image 160 shown in FIG. 8 or handing over the machining estimation simulation report 400 shown in FIG. 10.

As described above, when the machining time calculation unit 13 reads out the coefficient from the server 20 via the communication unit 19, the server 20 is preferably configured in the manner as described below. The computer device 30 calculates the machining time of the part P1 and other parts using a CAM program and supplies the calculated machining time to the coefficient calculation unit 22 of the server 20. The machining time calculated by the computer device 30 using the CAM program is almost an actual machining time.

The coefficient calculation unit 22 reads out the machining time that is calculated by the machining estimation apparatus 10 and accumulated in the accumulation unit 21. The coefficient calculation unit 22 calculates the coefficient for approximating the cutting time of the part to the actual machining time by comparing the machining time calculated by the machining estimation apparatus 10 and the machining time calculated by the computer device 30. The coefficient calculated by the coefficient calculation unit 22 is accumulated in the accumulation unit 21.

The more the computer device 30 executes the processing of calculating the machining time of the part and the more the coefficient calculation unit 22 executes the processing of calculating the coefficient, the more accurate coefficients are accumulated in the accumulation unit 21, which can approximate the cutting time of the part to the actual machining time. The machining time calculation unit 13 can always use the latest coefficient to calculate the machining time by reading out the coefficients accumulated in the accumulation unit 21 by way of the communication unit 19.

In FIG. 1, at least the image processing unit 12, the machining time calculation unit 13, and the machining cost calculation unit 14 can be configured by executing a machining estimation program in which a central processing unit (CPU) of the computer estimates the machining time and the machining cost. The image processing unit 12, the machining time calculation unit 13, the machining cost calculation unit 14, the display control unit 16, the communication unit 19, and the time measurement unit 101 may be configured as functions by the machining estimation program.

Figure 11:
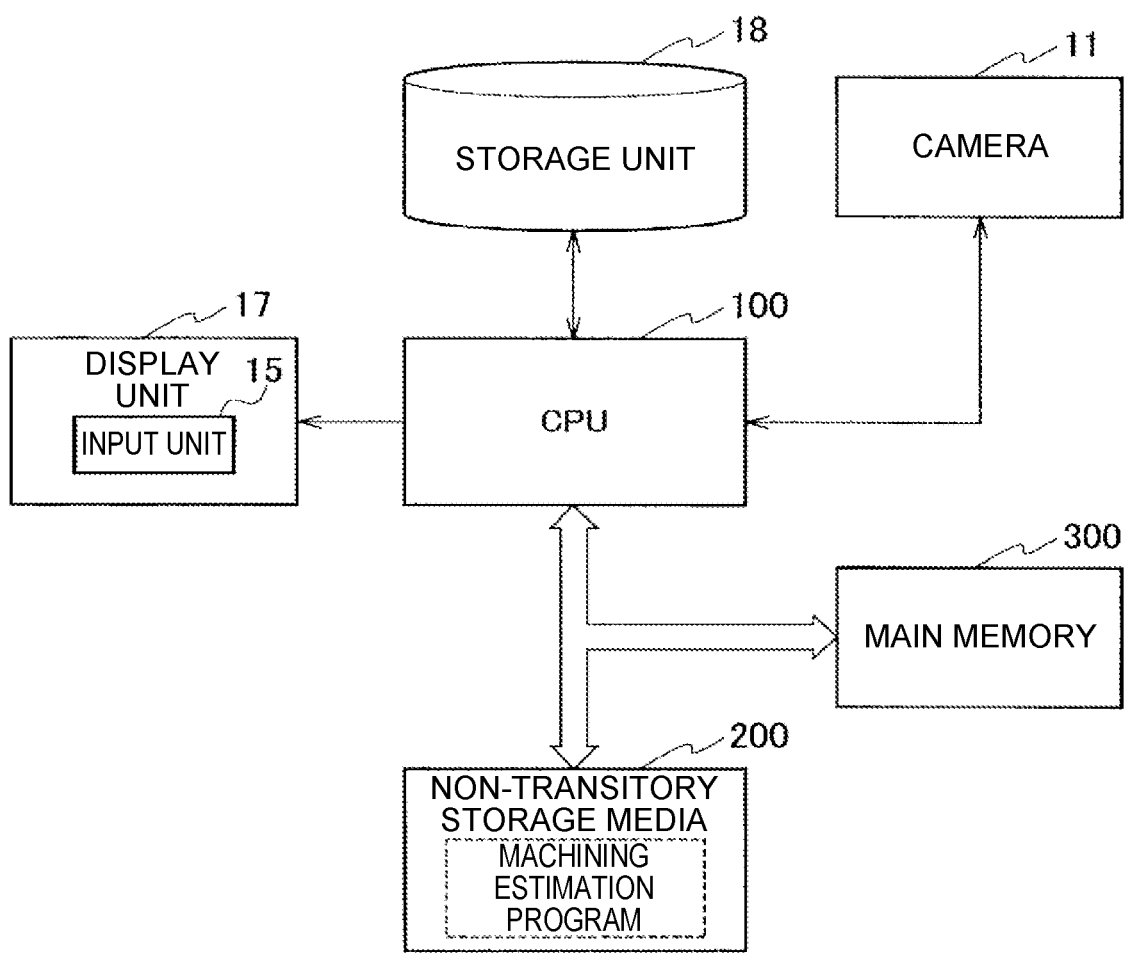
FIG. 11 is a block diagram showing an example of a configuration of a computer that executes the machining estimation program according to the one or more embodiments.
Figure 12A:
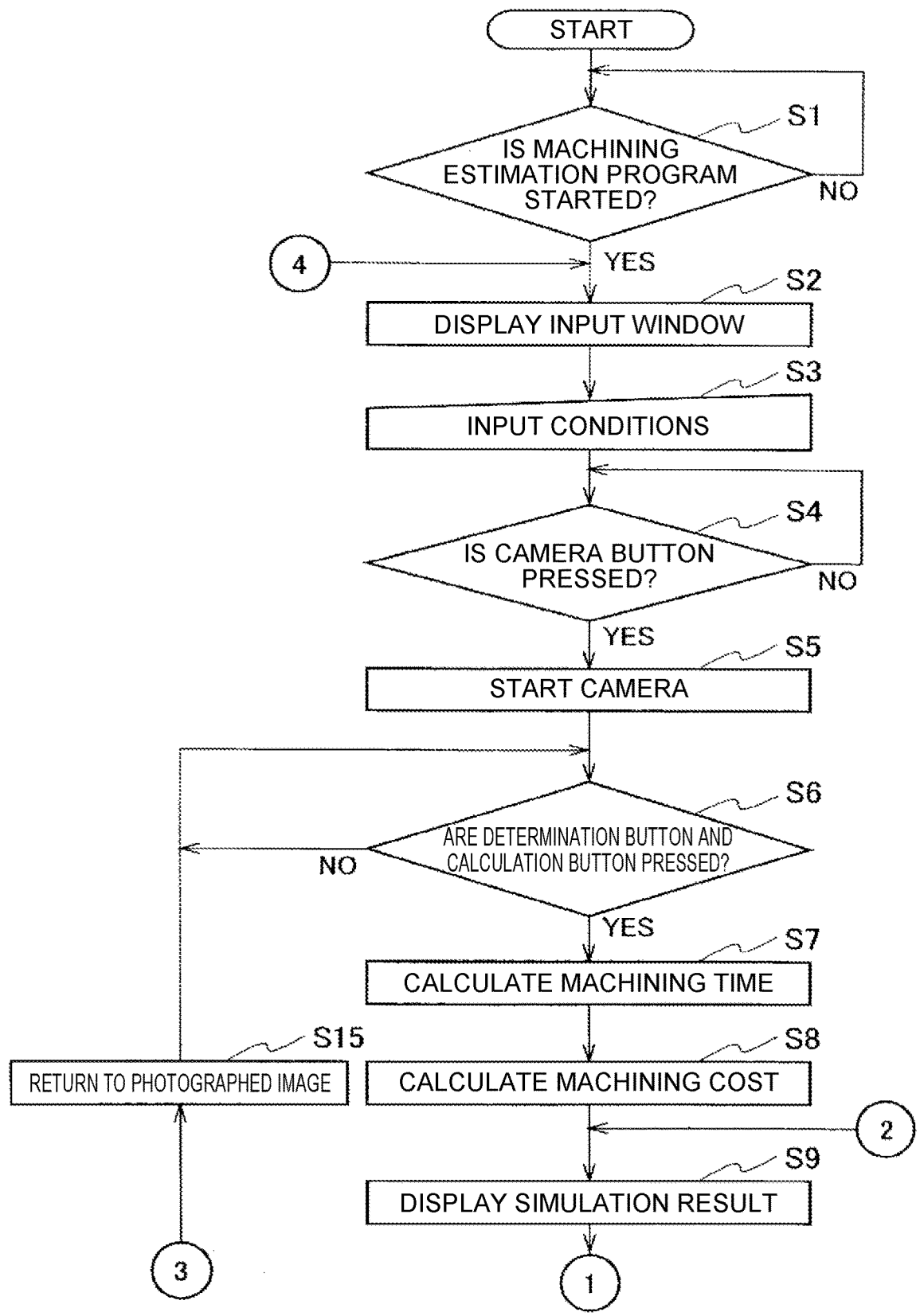
FIG. 12A is a flowchart showing the operation of the machining estimation apparatus according to the one or more embodiments, the processing by the machining estimation method according to the one embodiment and the machining estimation program according to the one embodiment.
Figure 12B:
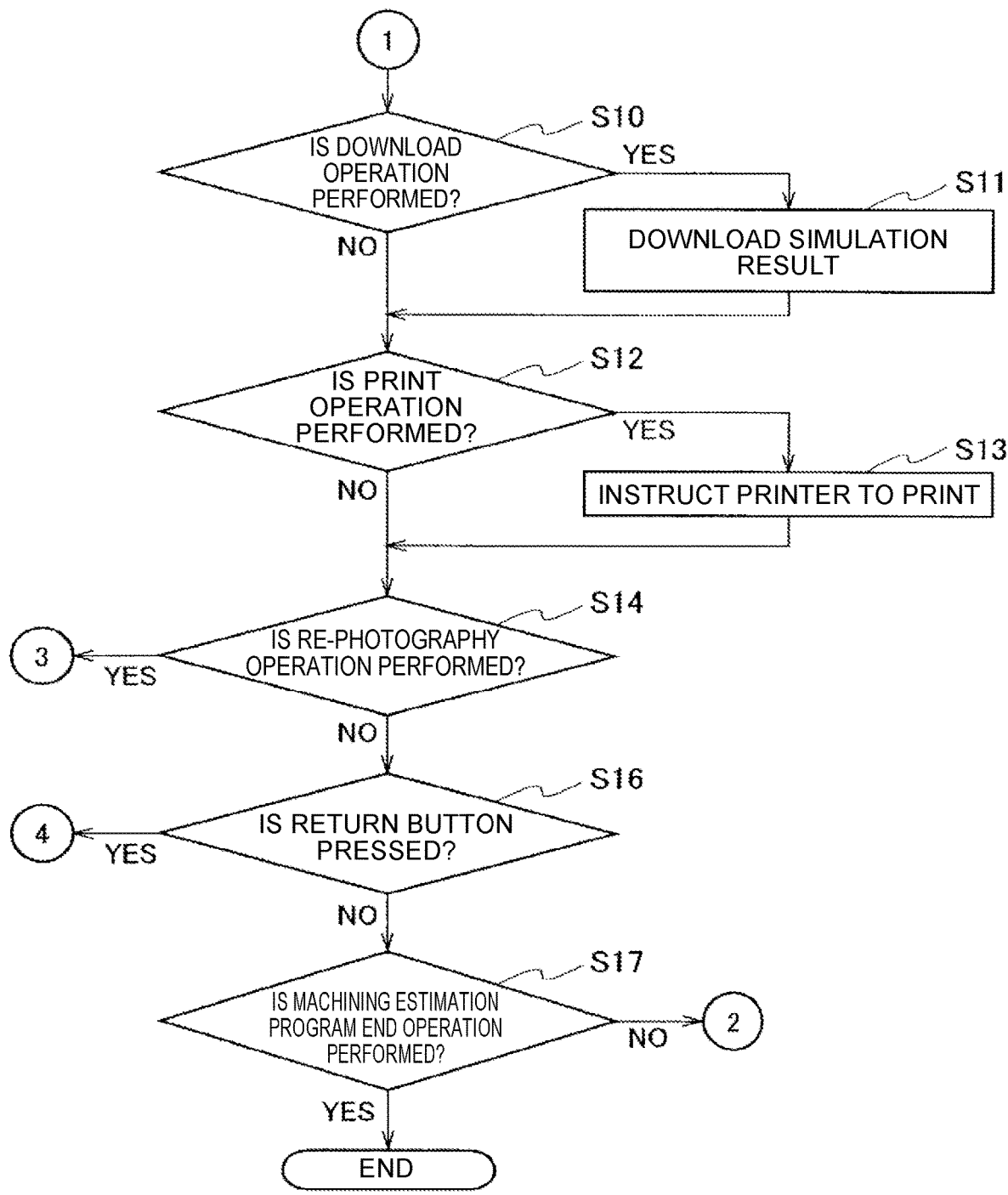
FIG. 12B is a flowchart showing the operation of the machining estimation apparatus according to the one or more embodiments, the processing by the machining estimation method according to the one embodiment and the machining estimation program according to the one embodiment.

As shown in FIG. 11, a non-transitory storage medium 200 included in the computer terminal, the tablet terminal, or the smart phone stores the machining estimation program as an application program. A CPU 100 loads the machining estimation program in a main memory 300 and executes each command described in the machining estimation program. FIG. 12A and FIG. 12B show processing when the CPU 100 executes each command described in the machining estimation program. FIG. 12A and FIG. 12B show an operation of the machining estimation apparatus and processing of the machining estimation method executed by the machining estimation apparatus 10.

In step S1 of FIG. 12A, the CPU 100 determines whether or not the machining estimation program is started. If the machining estimation program is not started (NO), the CPU 100 repeats the processing of step S1. If the machining estimation program is started (YES), in step S2, the CPU 100 causes the display unit 17 to display the input window 150 as shown in FIG. 3.

In step S3, the operator inputs each condition for estimation in the input window 150. As shown in FIG. 11, the input unit 15 is assumed to be a touch panel integrated with the display unit 17. In step S4, the CPU 100 determines whether or not the camera button 158 is pressed. If the camera button 158 is not pressed (NO), the CPU 100 repeats the processing of step S4. If the camera button 158 is pressed (YES), the CPU 100 starts the camera 11 in step S5.

In Step S6, the CPU 100 determines whether or not the determination button 111 and the calculation button 113 are pressed. In FIG. 12A, the determination as to whether or not the return button 112 is pressed and the processing when the return button 112 is pressed are omitted. If the determination button 111 and the calculation button 113 are not pressed (NO), the CPU 100 repeats the processing of step S6.

In step S6, if the determination button 111 and the calculation button 113 are pressed (YES), the CPU 100 calculates the machining time in step S7, and then calculates the machining cost in step S8. In step S9, the CPU 100 displays the simulation result on the display unit 17.

As shown in step S10 of FIG. 12B, the CPU 100 determines whether or not an operation to download the simulation result is performed. If the operation to download the simulation result is performed (YES), the CPU 100 downloads the simulation result into the HDD 60 in step S11 and moves the processing to step S12. If the operation to download the simulation result is not performed (NO), the CPU 100 moves the processing to step S12.

In step S12, the CPU 100 determines whether or not the operation to print the machining estimation simulation report 400 is performed. If the operation to print the machining estimation simulation report 400 is performed (YES), the CPU 100 instructs the printer 40 to print the machining estimation simulation report 400 in step S13, and move the processing to step S14. If the operation to print the machining estimation simulation report 400 is not performed (NO), the CPU 100 moves the processing to step S14.

In step S14, the CPU 100 determines whether or not an operation of re-photography by the re-photography button 165 is performed. If the operation of re-photography is performed (YES), in step S15 shown in FIG. 12A, the CPU 100 restores the photographed image 110 of FIG. 5, and returns the processing to step S6. If the operation of re-photography is not performed (NO), the CPU 100 determines whether or not the return button 166 is pressed in step S16. If the return button 166 is pressed (YES), the CPU 100 returns the processing to step S2 shown in FIG. 12A.

If the return button 166 is not pressed in step S16 (NO), in step S17, the CPU 100 determined whether or not an operation to end the machining estimation program is performed. If the operation to end the machining estimation program is not performed (NO), the CPU 100 returns the processing to step S9 shown in FIG. 12A. If the operation to end the machining estimation program is performed (YES), the CPU 100 ends the processing.

The present invention is not limited to the one or more embodiments described above, and various modifications can be made without departing from the scope of the present invention. In the one or more embodiments, the machining cost calculation unit 14 is provided to estimate the machining cost, but it is not mandatory to estimate the machining cost, and only the machining time may be estimated. However, it is preferable to estimate both the machining time and the machining cost.

In configuring the machining estimation apparatus in the one or more embodiments, use of hardwear and software is optional. The machining estimation program may be transmitted to the computer terminal, the tablet terminal, or the smartphone via a network such as the Internet so as to be downloaded.

The disclosure of the present application is related to the subject matter described in Japanese Patent Application No. 2019-033758 filed on Feb. 27, 2019, the disclosures of which are hereby incorporated by reference in its entirety.

The invention claimed is:

1. A machining estimation apparatus, comprising:
a camera configured to photograph a part to be estimated and a dimension reference marker, the part to be estimated being produced by cutting a sheet metal in advance;
an image processing unit configured to generate edge data by extracting an edge of the part photographed by the camera, and enlarges or reduces the edge data based on a size of the dimension reference marker photographed by the camera such that a size of the edge corresponds to an actual size of the part; and
a machining time calculation unit configured to calculate a length of a cutting line for cutting out the part from the sheet metal based on the edge of the edge data corresponding to the actual size of the part, and calculate a machining time for producing the part by cutting the cutting line in accordance with a material and a thickness of the sheet metal.

2. The machining estimation apparatus according to claim 1, wherein the machining time calculation unit calculates the machining time based on a total time of a time for making a pierced hole in the sheet metal, a time for cutting an approach from the pierced hole to the cutting line, and a time for cutting the cutting line.

3. The machining estimation apparatus according to claim 2, wherein the machining time calculation unit multiplies the total time by a coefficient that is equal to or more than one so that a time, in which a movement time of a machining head that emits a laser beam to the metal sheet to cut the metal sheet is added to the total time, is the machining time.

4. The machining estimation apparatus according to claim 3, further comprising a communication unit configured to read out a coefficient accumulated in an external server, wherein
the machining time calculation unit multiplies the total time by the coefficient that the communication unit reads out from the server.

5. The machining estimation apparatus according to claim 1, further comprising a machining cost calculation unit configured to calculate a machining cost of the part based on the machining time calculated by the machining time calculation unit.

6. A machining estimation method, comprising:
photographing, by a camera, a part to be estimated and a dimension reference marker, the part to be estimated being produced by cutting a sheet metal in advance;
generating, by an image processing unit, edge data by extracting an edge of the part photographed by the camera;
enlarging or reducing, by the image processing unit, the edge data based on a size of the dimension reference marker photographed by the camera such that a size of the edge corresponds to an actual size of the part; and
calculating, by a machining time calculation unit, a length of a cutting line for cutting out the part from the sheet metal based on the edge of the edge data corresponding to the actual size of the part, and calculating, by the machining time calculation unit, a machining time for producing the part by cutting the cutting line in accordance with a material and a thickness of the sheet metal.

7. A non-transitory computer-readable medium having stored thereon a machining estimation program causing a computer to execute:
a step of generating, based on photographed image data obtained by photographing a part to be estimated and a dimension reference marker by a camera, edge data by extracting an edge of the part to be estimated, the part to be estimated being produced by cutting a sheet metal in advance;
a step of enlarging or reducing the edge data based on a size of the dimension reference marker in the photographed image data such that a size of the edge corresponds to an actual size of the part;
a step of calculating a length of a cutting line for cutting out the part from the sheet metal based on the edge of the edge data corresponding to the actual size of the part; and
a step of calculating a machining time for producing the part by cutting the cutting line in accordance with a material and a thickness of the sheet metal.

8. The medium according to claim 7, further causing the computer to execute a step of calculating the machining time based on a total time of a time for making a pierced hole in the sheet metal, a time for cutting an approach from the pierced hole to the cutting line, and a time for cutting the cutting line.

9. The medium according to claim 8, further causing the computer to execute a step of multiplying the total time by a coefficient that is equal to or more than one so that a time, in which a movement time of a machining head that emits a laser beam to the metal sheet to cut the metal sheet is added to the total time, is the machining time.

10. The medium according to claim 9, further causing the computer to execute:
a step of reading out a coefficient accumulated in an external server; and
a step of multiplying the total time by the coefficient read out from the server.

11. The medium according to claim 7, further causing the computer to execute a step of calculating a machining cost of the part based on the calculated machining time.

* * * * *